L. A. & C. H. GREGORY.
PLANTER ATTACHMENT FOR PLOWS AND CULTIVATORS.
APPLICATION FILED DEC. 10, 1917.
1,290,978.
Patented Jan. 14, 1919.
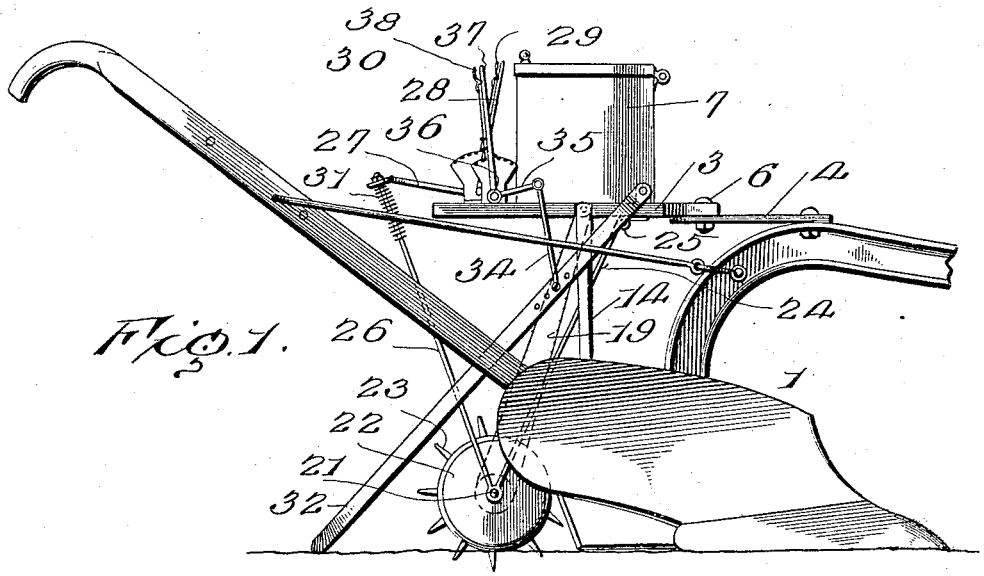
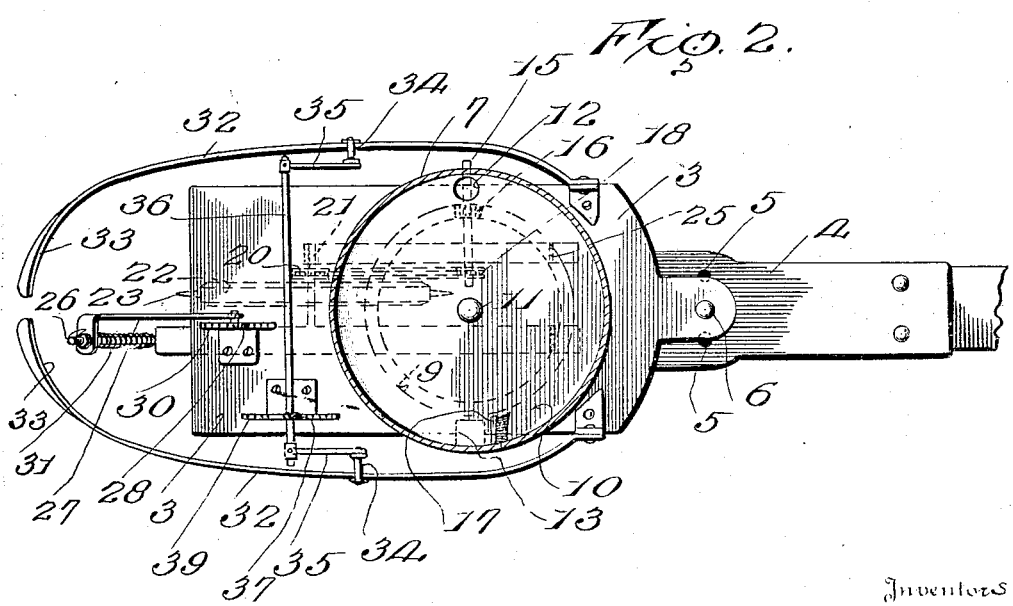
Inventors
L. A. Gregory
C. H. Gregory L. A. & C. H. GREGORY.
PLANTER ATTACHMENT FOR PLOWS AND CULTIVATORS.
APPLICATION FILED DEC. 10, 1917.
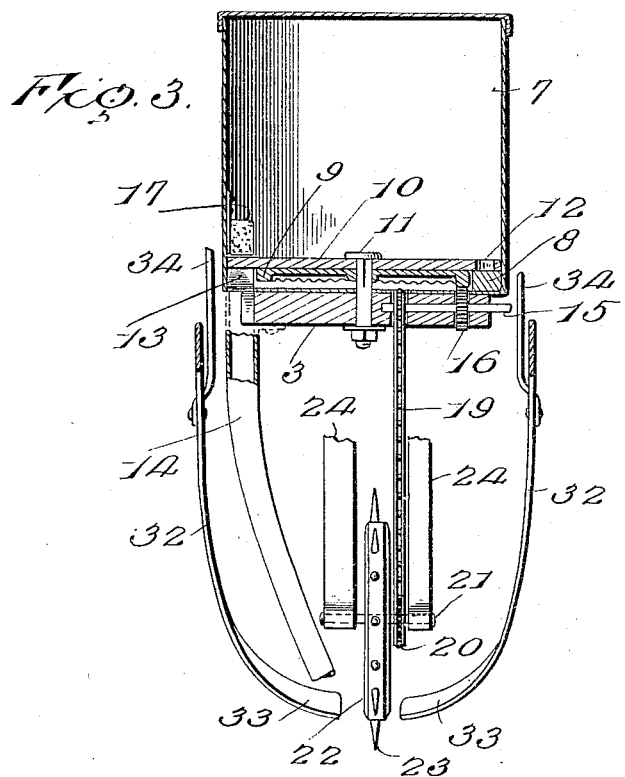
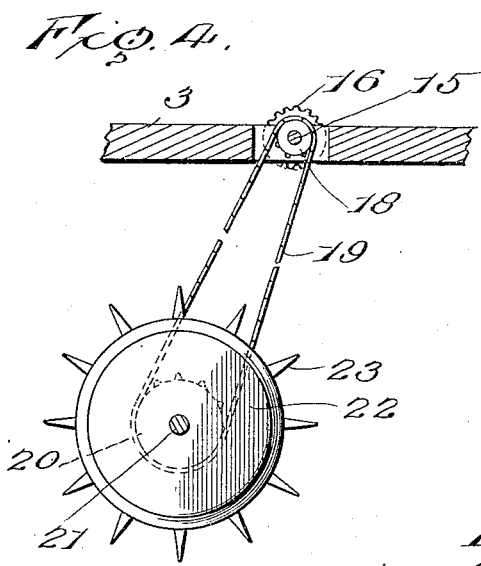

UNITED STATES PATENT OFFICE.

LUTHER A. GREGORY AND CHARLEY H. GREGORY, OF EDENWOLD, TENNESSEE.

PLANTER ATTACHMENT FOR PLOWS AND CULTIVATORS.

1,290,978.  Specification of Letters Patent.  Patented Jan. 14, 1919.

Application filed December 10, 1917. Serial No. 206,493.

*To all whom it may concern:*

Be it known that we, LUTHER A. GREGORY and CHARLEY H. GREGORY, citizens of the United States, residing at Edenwold, in the county of Davidson and State of Tennessee, have invented certain new and useful Improvements in Planter Attachments for Plows and Cultivators, of which the following is a specification.

Our invention is a planting attachment for plows, cultivators or other agricultural implements and has for its object the provision of a simple and efficient machine which may be readily attached to any ground-breaking implement so as to travel in rear of the same and in the furrow produced thereby and plant corn or other seed simultaneously with the breaking of the ground.

The invention is illustrated in the accompanying drawings and consists in certain novel features which will be first fully described and then more particularly pointed out in the appended claims.

In the drawings:

Figure 1 is an elevation of our improved machine coupled to an ordinary turning plow;

Fig. 2 is an enlarged plan view of the machine;

Fig. 3 is a transverse vertical section;

Fig. 4 is a detail of a portion of the operating gearing.

In the drawings, an ordinary turning plow is indicated in a more or less conventional manner at 1. In carrying out our invention, we provide a platform 3 to the front end of which a coupling bar or tongue 4 may be attached, the said coupling bar or tongue projecting forwardly so as to be secured to the beam of a plow. The said coupling bar or tongue 4 is provided with a transverse plurality of openings 5 therethrough, any one of which may receive the bolt 6 carried by the front extremity of the platform 3. By this arrangement we are enabled to set the planting mechanism in the central longitudinal line of the coupling bar or at either side of said line so that the seed will be deposited in the bottom of the furrow produced by the implement. The planting attachment, therefore, may be coupled to either a right or a left turning plow or to any make of cultivator.

Upon the platform 3 we secure a hopper 7 which may be of any desired form and dimensions and is provided with an annular rim or stationary floor member 8 which is preferably in the form of an annulus so as to provide a central space or chamber to accommodate a rack 9 on the under side of a seed disk 10 which is mounted pivotally in the bottom of the hopper by a king bolt 11 which passes centrally through the seed disk and the platform 3. The said disk is provided adjacent its edge with one or more seed openings 12 and the annulus 8 is also provided with a discharge opening 13, while a seed spout 14 has its upper end secured to the platform 3 immediately under the said discharge opening and has its lower end disposed adjacent the medial longitudinal plane of the machine so that seed will be directed to the bottom of the furrow.

In the platform 3, at one side, we mount a shaft 15 which is provided near its outer end with a pinion 16 meshing with the rack 9 so that the rotation of said shaft will move the seed disk in a horizontal plane and thereby carry the several seed openings successively over the discharge opening 13 through which the seed will pass into the seed spout, a brush 17 of any preferred construction being provided on the inner wall of the hopper so as to prevent an excessive quantity of seed passing through the discharge opening. Near its inner extremity the shaft 15 is equipped with a sprocket pinion 18 and a chain 19 is trained around the said pinion and around a sprocket wheel 20 which is secured on the end of the axle 21 carrying the ground wheel 22. The ground wheel 22 has a substantially V-shaped edge so that it will readily engage the bottom of the furrow and on its edge are radial teeth 23 which are adapted to dig into the ground and thereby hold the machine to its proper path, preventing lateral movement or oscillation of the planter. The axle 21 is carried by the lower ends of hangers 24 which have their upper ends connected to the under side of the platform 3 near the front end thereof by hinges 25 so that the hangers may swing in a vertical plane and consequently may be caused to hold the ground wheel at any desired height relative to the platform. Moreover, this mounting of the ground wheel permits it to ride over large stones or other stationary obstructions which may be encountered in the furrow. To hold the ground wheel in an adjusted position, we provide a link or connecting bar 26 which has its lower end fitted upon the axle and has its upper end engaged by the rear extremity of a lever or crank 27 mounted upon the rear end of the platform 3 and provided with a handle 28 which carries a latch 29 adapted to ride over and engage a segment 30 so that the lever may be held in any position in which it may be set. The connecting rod 26 has a limited slidable movement relative to the crank or lever 27 and a spring 31 is mounted upon the rod between a stop thereon and the outer end of the said crank or lever. The spring is normally expanded so as to hold the ground wheel to its work, but when the handle 28 is manipulated the crank 27 will raise or lower the connecting bar and thereby set the ground wheel at a higher or lower position.

Coverers 32 are provided to turn the loose surface soil over onto the seed and these coverers are preferably in the form of flat bars pivoted at their front ends to the platform 3 and having their edges presented to the ground. The rear ends of the coverers are turned inwardly, as shown at 33, so that they will run upon the ground in rear of the ground wheel, as shown in Fig. 1, and thereby scrape the loose surface soil into the furrow and over the seed. A coverer is provided at each side of the machine and a link 34 is pivoted at its lower end to the adjacent coverer and at its upper end to a crank 35 on the end of a rock shaft 36 which is journaled in suitable bearings upon the platform in rear of the hopper. A hand lever 37 is secured to said rock shaft and is equipped with a latch 38 arranged to engage a segment 39 and thereby hold the lever in a set position. It will be readily understood that by properly adjusting the lever the coverers may be caused to engage more or less deeply in the surface soil and thereby turn more or less earth over onto the seed.

It is thought the uses and operation of our improved machine will be readily understood from the foregoing description taken in connection with the accompanying drawings. The planter is coupled to a plow or cultivator and as the latter is drawn forward to form a furrow or turn up the soil the ground wheel will roll along a path directly in rear of the ground-engaging blades. Motion will thus be imparted to the shaft 15 through the gearing shown and described so that the seed disk 10 will be caused to rotate about the pivot 11 and the seed within the hopper will be carried by the seed openings to the discharge opening 13. The seed will, of course, gravitate through the seed spout to the bottom of the furrow and the loose soil will be turned over the seed by the coverers 32.

Having thus described the invention, what is claimed as new is:

1. A planting attachment for a ground-breaking implement comprising a platform, a seed-depositing mechanism carried by the platform, a coupling tongue adapted at its front end to be secured to the ground-breaking implement and provided in rear of its front end with a transverse series of vertical openings, a fastening device inserted through the front extremity of the platform and through any one of the openings in the tongue, a single ground wheel supporting the platform and running directly behind the ground-breaking implement in the furrow made by the same, and operative connections between said wheel and the seed-depositing mechanism.

2. The improved planting attachment for ground-breaking implements described and shown consisting of a platform, a coupling bar for connecting the platform to the ground-breaking implement to run directly beyond the same, a seed-dropping mechanism carried by the platform, hangers hinged to and depending from the platform, a single ground wheel carried by and between the lower ends of the hangers to thereby support the platform and run in the furrow produced by the ground-breaking-implement, operative connections between the ground-wheel and the seed-dropping mechanism, means mounted on the platform for raising the ground wheel and normally yieldably holding it in a lowered position, coverer bars pivoted to the sides of the platform and depending therefrom to operate in rear of the ground wheel, and means mounted on the platform for raising and lowering the coverer bars independently of the ground wheel.

In testimony whereof we affix our signatures.

LUTHER A. GREGORY. [L. S.]
CHARLEY H. GREGORY. [L. S.]

Copies of this patent may be obtained for five cents each, by addressing the "Commissioner of Patents Washington, D. C."